United States Patent [19]

Lee

[11] Patent Number: 5,560,640
[45] Date of Patent: Oct. 1, 1996

[54] REAR SUSPENSION FOR A FOUR-WHEEL STEERING SYSTEM

[75] Inventor: Unkoo Lee, Kyungki-do, Rep. of Korea

[73] Assignee: Hyundai Motor Company, Seoul, Rep. of Korea

[21] Appl. No.: 447,248

[22] Filed: May 22, 1995

[51] Int. Cl.⁶ .................................................. B60G 11/26
[52] U.S. Cl. ..................... 280/710; 280/91.1; 180/411; 180/414
[58] Field of Search ................................ 280/710, 91, 97

[56] References Cited

U.S. PATENT DOCUMENTS 4,846,296  7/1989  Uchida et al. ............................ 280/91
4,901,811  2/1990  Uno et al. ................................. 280/91
5,005,849  4/1991  Gandiglio et al. ........................ 280/91

*Primary Examiner*—Kenneth R. Rice
*Attorney, Agent, or Firm*—Birch, Stewart, Kolasch & Birch, LLP

[57] ABSTRACT

A rear suspension for a four-wheel steering system, has a wheel carrier for rotatably supporting a wheel. There is a subframe mounted on a lower portion of a vehicle body with a plurality of links for connecting the subframe to the wheel carrier. Also included is a hydraulic bushing device formed on a mounting portion of the subframe, and a hydraulic control device for controlling a steering angle of the rear wheel by feeding hydraulic fluid to the hydraulic bushing device in accordance with vehicle speed and a front wheel steering angle.

6 Claims, 5 Drawing Sheets

REAR SUSPENSION FOR A FOUR-WHEEL STEERING SYSTEM

BACKGROUND OF THE INVENTION

1. Field of the Invention

The present invention relates to a rear suspension for a four-wheel steering system, and in particular to a rear suspension which can control the position of the rear wheels in accordance with a vehicle's steering direction and speed.

2. Description of Related Art

In general, the steering system is a means by which the driver of a vehicle is able to control the position of the front wheels. The system must provide ease of handling, good directional control, and stability. This is achieved by the steering system in conjunction with the suspension system.

However, the front wheel steering system has problems that when the vehicle is driven at high speed, the rear wheels tend to follow the vehicle body during a turn such that a center of the vehicle is abruptly declined to deteriorate the stability and unequal tire wear occurs.

Further, when the vehicle is driven at low speed, the front wheel steering system cannot sufficiently reduce a turning radius.

To solve the above described problems of the front wheel steering system, many types of four-wheel steering systems have been proposed. The four-wheel steering system controls the steering angle of the rear wheels as well as the front wheels. Advantages of the four-wheel steering system includes a reduced turning radius, better vehicle control during lane changes, and easier parallel parking. There are two general types of the four-steering systems: mechanically controlled and electronically controlled systems.

However, all of the conventional four-wheel steering systems are designed such that when the steering wheel is turned, the front and rear wheels are turned simultaneously. Accordingly, a complicated connecting structure is required between the front and rear wheels.

SUMMARY OF THE INVENTION

Accordingly, an object of the present invention is to provide a rear suspension system which can turn the rear wheels independently of the front wheels. A further object of the invention is to provide a four-wheel steering system which is simple in structure and is low in manufacturing cost.

Additional objects and advantages of the invention will be set forth in part in the description which follows, and in part will be inherent from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention provides a rear suspension for a four-wheel steering system, comprising: a wheel carrier for rotatably supporting a wheel; a subframe mounted on a lower portion of a vehicle body; a plurality of links for connecting the subframe to the wheel carrier; a hydraulic bushing formed on mounting portion of the subframe; and a hydraulic control means for controlling a steering angle of the rear wheel by feeding hydraulic fluid to the hydraulic bushing in accordance with vehicle speed and a front wheel steering angle.

In another aspect, the present invention provides the rear suspension wherein, the hydraulic bushing comprises a reservoir for reserving fluid, a hydraulic pump for producing hydraulic fluid, a directional control valve for selectively feeding hydraulic fluid produced from the hydraulic pump to the hydraulic bushing, an electronic control unit for controlling the directional control valve in accordance with vehicle's speed and steering angle of a front wheel.

In still another aspect, the present invention provides the rear suspension wherein the hydraulic bushing comprises first and second elastic bushings respectively formed on right and left sides of the subframe, the first elastic bushing having a front variable hydraulic chamber connected to the directional control valve via a first hydraulic fluid line and a rear variable hydraulic chamber connected to the directional control valve via a second hydraulic fluid line, and the second elastic bushing having a front variable hydraulic chamber connected to the directional control valve via the second hydraulic fluid line and a rear variable hydraulic chamber connected to the directional control valve via a first hydraulic fluid line.

In a further aspect, the hydraulic bushing comprises a first elastic bushing formed on a front portion of a left side of the subframe, a second elastic bushing formed on a rear portion of the left side of the subframe, a third elastic bushing formed on a front portion of a right side of the subframe and a fourth elastic bushing formed on a rear portion of the right side of the subframe, the first elastic bushing having a front variable hydraulic chamber connected to the directional control valve via a first hydraulic fluid line and a rear variable hydraulic chamber connected to the directional control valve via a second hydraulic fluid line, the second elastic bushing having a front variable hydraulic chamber connected to the directional control valve via the first hydraulic fluid line and a rear variable hydraulic chamber connected to the directional control valve via the second hydraulic fluid line, the third elastic bushing having a front variable hydraulic chamber connected to the directional control valve via the second hydraulic fluid line and a rear variable hydraulic chamber connected to the directional control valve via the first hydraulic fluid line, and the fourth elastic bushing having a front variable hydraulic chamber connected to the directional control valve via the second hydraulic fluid line and a rear variable hydraulic chamber connected to the directional control valve via the first hydraulic fluid line.

In a still further aspect, the directional control valve is controlled by the electronic control unit such that when the vehicle is at low speed, the rear wheels steer in the same direction as the front wheels, and when the vehicle is at high speed, the rear wheels steer in the opposite direction to the front wheels.

It is to be understood that both the foregoing general description and the following detailed description are exemplary and the explanatory only and are not restrictive of the invention, as claimed.

BRIEF DESCRIPTION OF THE DRAWINGS

The accompanying drawings, which are incorporated in and constitute a part of the disclosure, illustrate one embodiment of the invention and together with the description, serve to explain the principles of the invention.

DETAILED DESCRIPTION OF PREFERRED EMBODIMENTS

Figure 1:
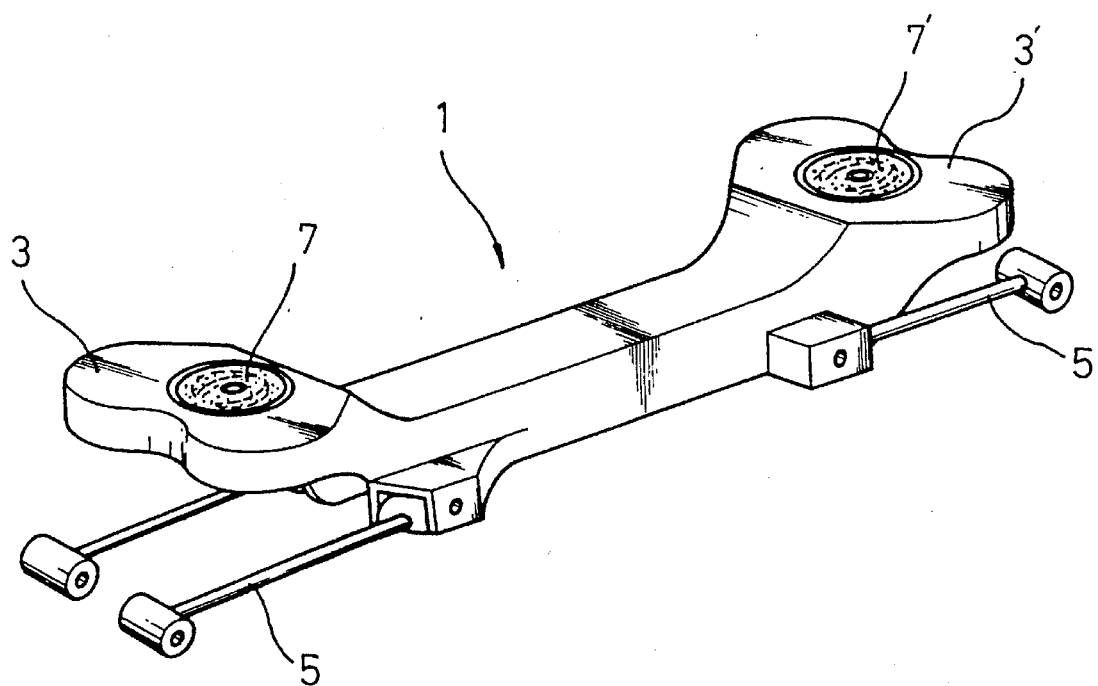
FIG. 1 is a view showing a subframe of a rear suspension in accordance with a first embodiment of the present invention.

Reference will now be made in detail to the present preferred embodiment of the invention, two examples of which are illustrated in the accompanying drawings. Wherever possible, the same reference numbers will be used throughout the drawings to refer to the same or like parts.

Certain terminology will be used in the following description for convenience and reference only and will not be limiting The words "right", "left", "front" and "rear" will designate directions in the drawings to which reference is made.

As used herein "phase" is when the rear wheels steer in the same direction as the front wheels, "contra-phase" is when the rear wheels steer in the opposite direction to the front wheels, and "neutral" is when the rear wheel steering angle is center to the geometric center line of the vehicle.

FIG. 1 shows a subframe of a rear suspension in accordance with a first embodiment of the present invention, in which the reference numeral 1 represents the subframe.

Left and right sides 3 and 3' of the sub-frame 1 project upwardly and are connected by a plurality of links 5 with wheel carriers (not shown).

Hydraulic bushings 7 and 7' are respectively formed on the left and right sides 3 and 3' to mount the subframe 1 on a vehicle body (not shown).

Figure 2:
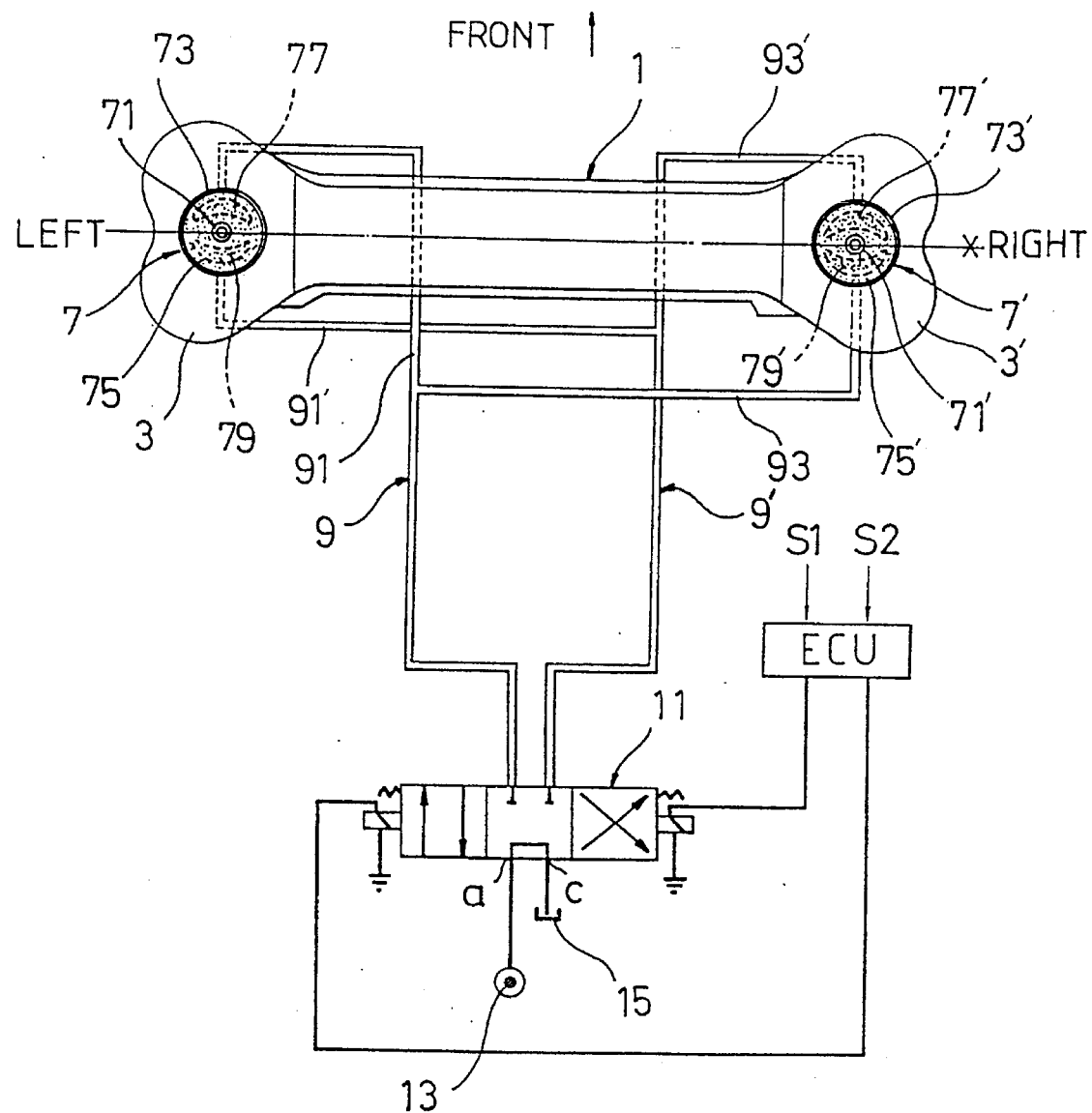
FIG. 2 is a subframe with a hydraulic circuit for supplying hydraulic fluid to each bushing of the subframe in accordance with the first embodiment.

FIG. 2 shows a hydraulic circuit for supplying hydraulic fluid to each bushing 7 and 7' of the subframe in accordance with the first embodiment.

As described above, the bushings 7 and 7' are respectively provided on the left and right sides 3 and 3' of the subframe 1. The bushing 7 comprises an inner tube 71, an outer tube 73 and an elastic member 75 fitted between the inner and outer tubes 71 and 73. The bushing 7' also comprises an inner tube 71' an outer tube 73' and an elastic member 75' fitted between the inner and outer tubes 71' and 73'. The elastic members 75 and 75' are respectively provided with variable fluid chambers 77, 79 and 77', 79' on their respective front and rear sides. Each of the variable fluid chambers is connected with a directional control valve 11 via pressure lines 9 and 9'. The directional control valve 11 is connected with a hydraulic pump 13 for producing hydraulic fluid and reservoir 15 for reserving fluid. The directional control valve 11 is controlled by an electronic control unit ECU in accordance with the vehicle's steering angle and speed.

The variable fluid chamber 77 defined on the front portion of the elastic member 75 is connected with the directional control valve 11 via a branch line 91 of the pressure line 9, and the variable fluid chamber 79' defined on the rear portion of the elastic member 75' is connected with the directional control valve 11 via a branch line 93 of the pressure line 9'.

Further, the variable fluid chamber 79 formed on the rear portion of the elastic member 75 is connected with the directional control valve 11 via a branch line 91' of the pressure line 9' and the variable fluid chamber 77' defined on a front portion of the elastic member 75' is connected with the directional control valve 11 via a branch line 93' of the pressure line 9'.

In this drawing of FIG. 2, hydraulic fluid is evenly fed to all of the variable pressure chambers such that the rear wheels are not steered. The reference character X represents an axis of the subframe 1 when the rear wheel angle is in a neutral phase.

The operation of the rear suspension in accordance with the embodiment will now be described in detail with reference to FIGS. 3A and 3B.

Figure 3A:
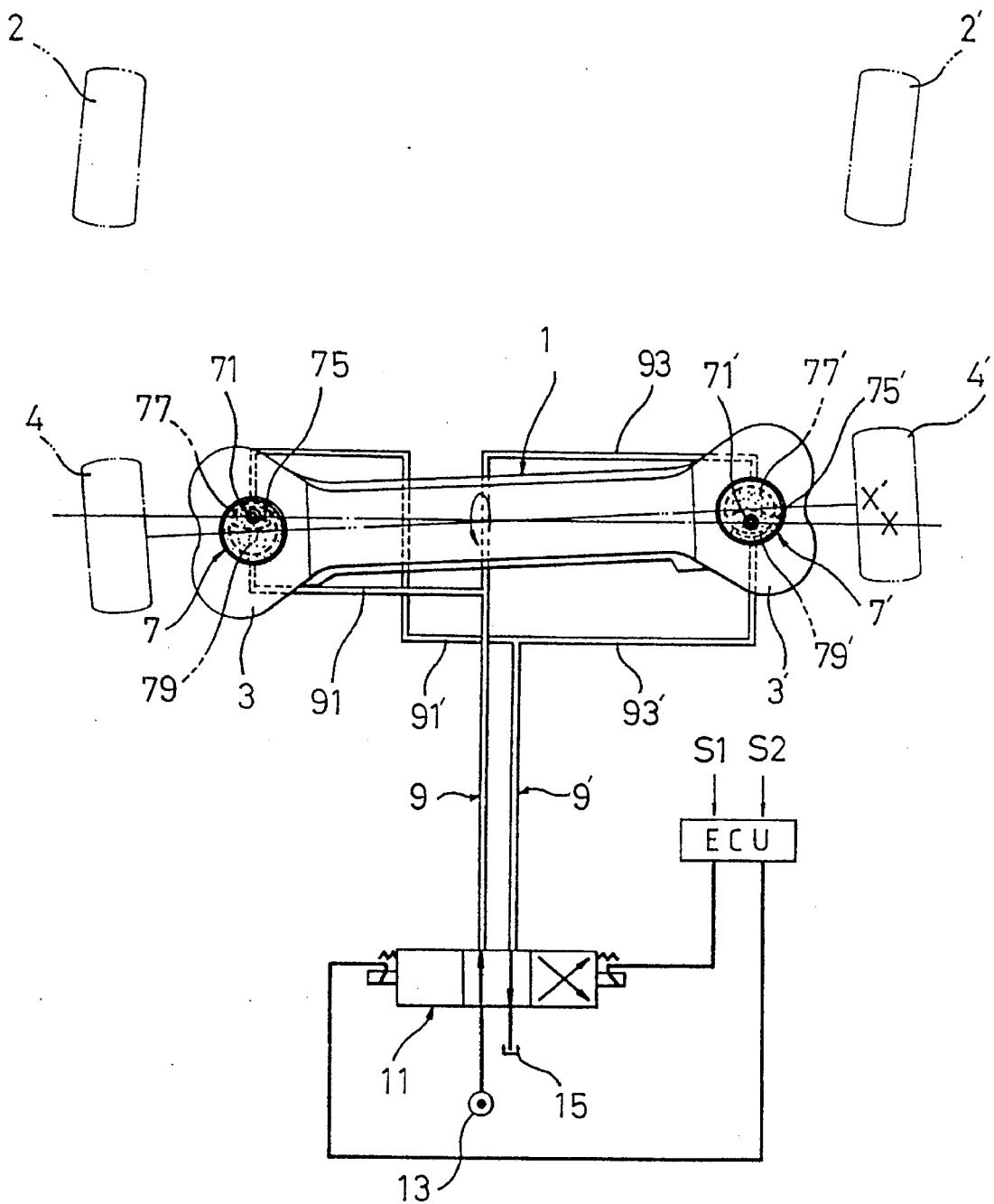
FIG. 3A is a view showing a subframe when the vehicle is at a low speed and in a right turn.

FIG. 3A shows the subframe when the vehicle is at a speed lower than a reference value and in a right turn. In general, when the vehicle drives at low speed, it is preferable that the rear wheels 2 and 2' are steered in the opposite direction to the front wheels 4 and 4' to reduce a turning radius, that is, the counter phase state is preferable.

Accordingly, when the vehicle is in a right turn with a speed lower than the reference value, these are detected by steering angle and vehicle speed sensors S1 and S2. The electronic control unit ECU receives the signals from both sensors S1 and S2 and controls the directional control valve such that the line 9 can communicate with the hydraulic pump 13 and the line 9' can communicate with the reservoir. Therefore, the hydraulic fluid is fed from the hydraulic pump 13 to the line 9 and this hydraulic fluid is supplied to the respective variable fluid chambers 79 and 77' via the respective branch lines 91 and 93 to thereby expand the chambers 79 and 77'.

At this point, hydraulic fluid which has been fed to the variable fluid chambers 77 and 79' is drained to the reservoir 15 through the branch lines 91' and 93' of the line 9' to thereby contract the chambers 77 and 79'.

As a result, the left side 3 of the subframe 1 moves frontward on the basis of the inner tube 71 and the right side 3' of the subframe 1 moves rearward on the basis of the inner tube 71'. That is, as shown in the drawing, the axis of the subframe moves from X to X' such that the left and right rear wheels 4 and 4' connected with the subframe by means of the links turn to the left. That is, the rear wheels are to be in counter phase state.

Figure 3B:
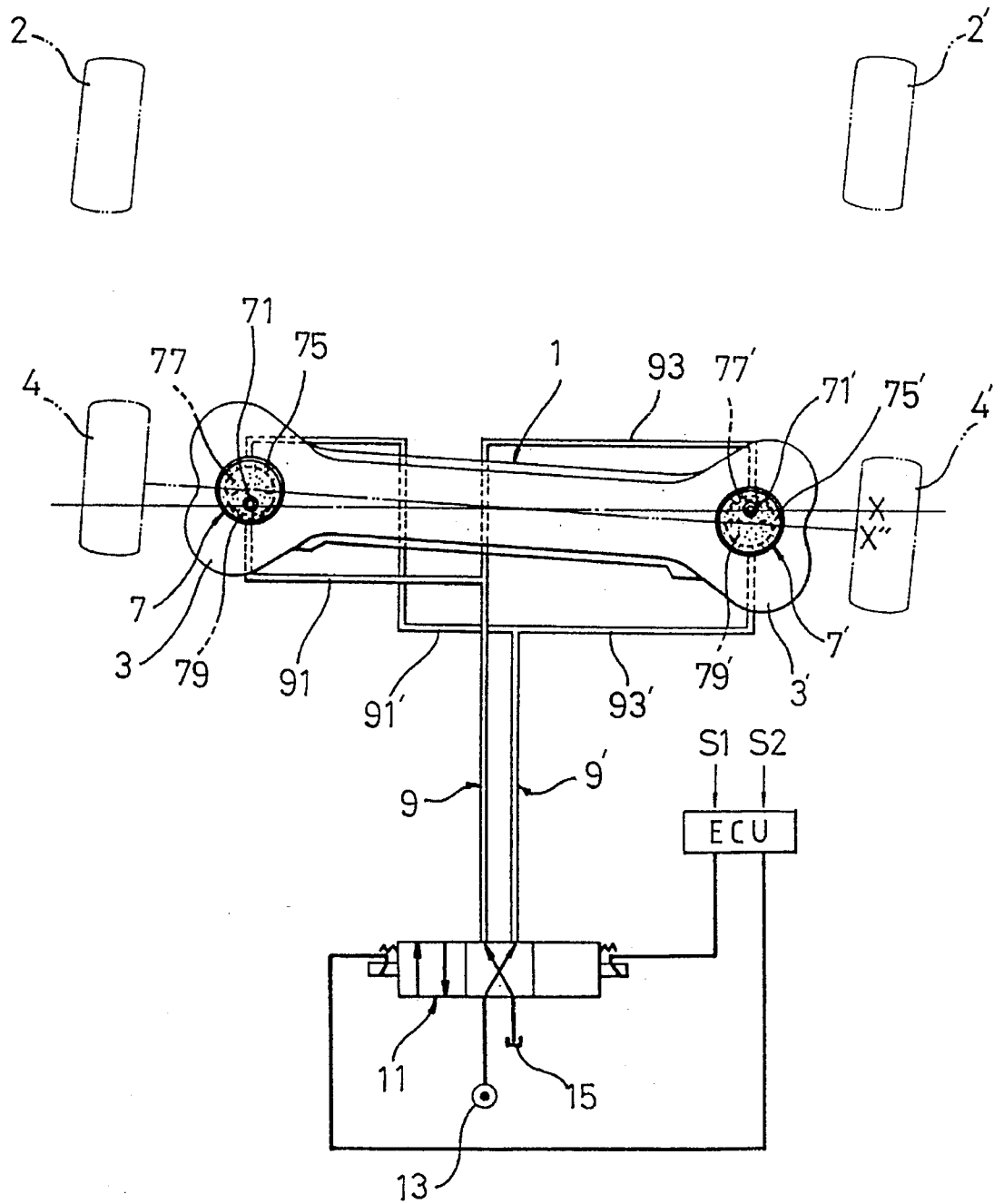
FIG. 3B is a view showing a subframe when the vehicle is at a high speed and in a right turn.

FIG. 3B shows the subframe when the vehicle drives above a speed of the reference value during a right turn. In general, when the vehicle is driven at a high speed, it is preferable that the rear wheels 2 and 2' are steered in the same direction as the front wheels 4 and 4', that is, the phase state is preferable.

Accordingly, when the vehicle is in a right turn with a speed higher than the reference value, these are detected by the steering angle sensor S1 and the vehicle speed sensor S2. The electronic control unit ECU receives the signals from both the steering angle sensor S1 and the vehicle speed sensor S2 and controls the directional control valve 11 such that the line 9' can communicate with the hydraulic pump 13 and the line 9 can communicate with the reservoir 15. Therefore, the hydraulic fluid is fed from the hydraulic pump 13 to the line 9' and this hydraulic fluid is fed to the respective variable fluid chambers 77 and 79' via the respective branch lines 91' and 93' to thereby expand these chambers.

At the same time, hydraulic fluid which has been fed to the variable fluid chambers 79 and 77' is drained to the reservoir 15 through the respective branch lines 91 and 93 of the line 9 to thereby contract the chambers 79 and 77'.

As a result, the left side 3 of the subframe 1 moves rearward on the basis of the inner tube 71 and the right side 3' of the subframe 1 moves frontward on the basis of the inner tube 71'. That is, as shown in the drawing, the axis of the subframe moves from X to X', so that the left and right rear wheels 4 and 4' connected with the subframe by means of the links turn to the right.

Figure 4:
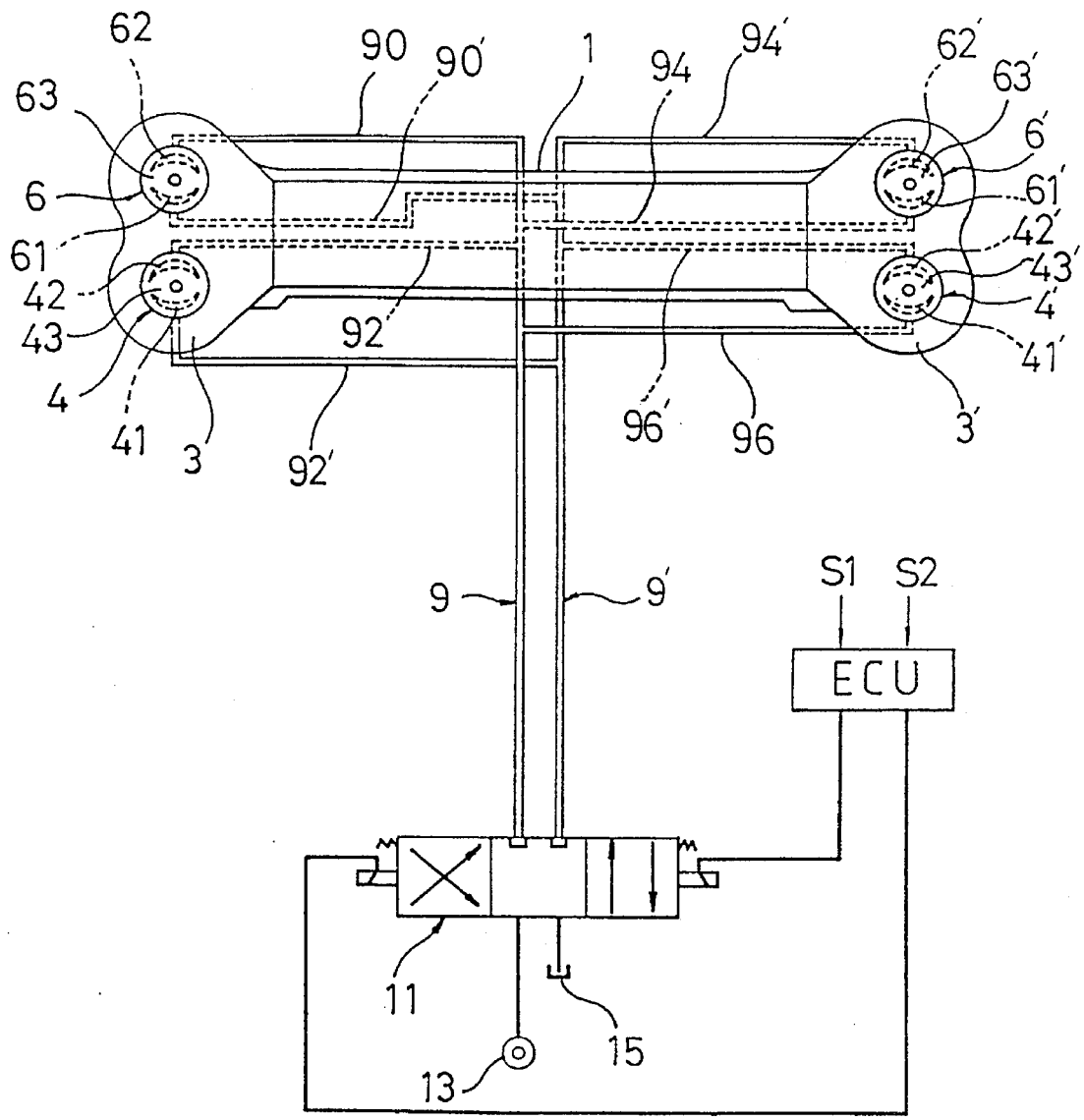
FIG. 4 is a view showing a rear suspension with a hydraulic circuit for supplying hydraulic fluid to the subframe in accordance with a second embodiment.

FIG. 4 shows a rear suspension with a hydraulic circuit for supplying hydraulic fluid to the subframe in accordance with a second embodiment.

The structure of the subframe 1 is the same as that of the first embodiment except that two hydraulic bushings are provided on each left and right side of the subframe 1.

That is, hydraulic bushings 4 and 6 are provided on front and rear portions of the left side 3 of the subframe 1, respectively. Each structure of the bushings 4 and 6 is the same as that of the first embodiment. The hydraulic bushing 6 includes an elastic member 63 having a front variable fluid chamber 62 connected with the directional control valve 11 via the line 9 and a rear variable fluid chamber 61 connected with the directional control valve 11 by the line 9'. The hydraulic bushing 4 includes an elastic member 43 also provided with a front variable fluid chamber 42 connected with the directional control valve 11 via the line 9 and a rear variable fluid chamber 41 connected with the directional control valve 11 by the line 9'.

Hydraulic bushings 4' and 6' also have front and rear portions of the right side 3' of the subframe 1, respectively. Each structure of the bushings 4' and 6' is also the same as that of the first embodiment. The hydraulic bushing 6' includes an elastic member 63' having a front variable fluid chamber 62' connected with the directional control valve 11 via the line 9' and a rear variable fluid chamber 61' connected with the directional control valve 11 by the line 9. The hydraulic bushing 4' includes an elastic member 43' also provided with a front variable fluid chamber 42' connected with the directional control valve 11 by the line 9' and a rear variable fluid chamber 41' connected with the directional control valve 11 by the line 9.

Accordingly, if the vehicle turns to the right with a speed higher than the reference value, the electronic control unit ECU receives signals from the steering angle sensor S1 and the speed sensor S2 and controls the directional control valve 11 such that the lines 9 and 9' can communicate with the hydraulic pump 13 and the reservoir 15, respectively.

As a result, hydraulic fluid produced by the hydraulic pump 13 is supplied to the variable fluid chambers 62 and 42 formed on the respective hydraulic bushings 6 and 4 through the respective branch lines 90 and 92 of the line 9 to thereby expand the fluid chambers 62 and 42. Further, the hydraulic fluid is also fed to the variable fluid chambers 61' and 41' formed on the respective hydraulic bushings 6' and 4' through the branch lines 94 and 96, respectively, to thereby expand the fluid chambers 61' and 41'.

On the one hand, hydraulic fluids which have been fed to the variable fluid chambers 61 and 41 are exhausted to the reservoir 15 through the branch lines 90' and 92' of the line 9' and hydraulic fluid which have been fed to the variable fluid chamber 62' and 42' are also exhausted to the reservoir through the branch line 94' and 96' of the line 9'.

Accordingly, the left side 3 of the subframe 1 moves frontward on the basis of each inner tube of the hydraulic bushings 6 and 4 and the right side 3' of the subframe 1 moves rearward on the basis of the respective inner tubes of the hydraulic bushings 6' and 4'. That is, the left and right rear wheels 4 and 4' connected with the subframe by means of the links turn to the right.

Although the rear suspension according to the second embodiment is complicated in its structure, since two hydraulic bushings are provided on each left and right side 3 and 3' of the frame 1, the operation reliability can be more improved than the first embodiment.

It will be apparent to those skilled in the art that various modifications and variations can be made in the rear suspension system for the four-wheel steering system of the present invention and in construction of this system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A rear suspension for a four-wheel steering system, comprising:

a wheel carrier for rotatably supporting a wheel;

a subframe mounted on a lower portion of a vehicle body;

a plurality of links for connecting the subframe to the wheel carrier;

means for detecting a steering angle and whether a vehicle speed is above or below a predetermined speed;

hydraulic bushing means having at least one variable hydraulic chamber therein and formed on a mounting portion of the subframe; and hydraulic control means, responsive to said means for detecting, for controlling the steering angle of the rear wheel by selectively supplying hydraulic fluid to the at least one variable hydraulic chamber within the hydraulic bushing means, thereby turning the front and rear wheels into one of the same direction or the opposite direction in accordance with the detected speed and steering angle.

2. The rear suspension according to claim 1, wherein the hydraulic control means comprises a reservoir for reserving fluid, a hydraulic pump for producing hydraulic fluid, a directional control valve for selectively supplying hydraulic fluid produced from the hydraulic pump to the at least one fluidly expandable chamber of the hydraulic control means, and an electronic control unit for controlling the directional control valve in accordance with vehicle's speed and steering angle of a front wheel.

3. The rear suspension according to claim 2, wherein the hydraulic control means comprises first and second elastic bushings respectively formed on right and left sides of the subframe, the first elastic bushing having a front variable hydraulic chamber connected to the directional control valve via a first hydraulic fluid line and a rear variable hydraulic chamber connected to the directional control valve via a second hydraulic fluid line, and the second elastic bushing having a front variable hydraulic chamber connected to the directional control valve via the second hydraulic fluid line and a rear variable hydraulic chamber connected to the directional control valve via a first hydraulic fluid line.

4. The rear suspension according to claim 2, wherein the hydraulic control means comprises a first elastic bushing formed on a front portion of a left side of the subframe, a second elastic bushing formed on a rear portion of the left side of the subframe, a third elastic bushing formed on a front portion of a right side of the subframe and a fourth elastic bushing formed on a rear portion of the right side of the subframe, the first elastic bushing having a front variable hydraulic chamber connected to the directional control valve via a first hydraulic fluid line and a rear variable hydraulic chamber connected to the directional control valve via a second hydraulic fluid line, the second elastic bushing having a front variable hydraulic chamber connected to the directional control valve via the first hydraulic fluid line and a rear variable hydraulic chamber connected to the directional control valve via the second hydraulic fluid line, the third elastic bushing having a front variable hydraulic chamber connected to the directional control valve via the second hydraulic fluid line and a rear variable hydraulic chamber connected to the directional control valve via the first hydraulic fluid line, and the fourth elastic bushing having a front variable hydraulic chamber connected to the directional control valve via the second hydraulic fluid line and a rear variable hydraulic chamber connected to the directional control valve via the first hydraulic fluid line.

5. The rear suspension according to claim 2, wherein the directional control valve is controlled by the electronic control unit such that when the vehicle is below the predetermined speed, the rear wheels steer in the opposite direction as the front wheels, and when the vehicle is above the predetermined speed, the rear wheels steer in the same direction as the front wheels.

6. The rear suspension according to claim 1, wherein the front and rear wheels steer in the opposite direction when the vehicle is below the predetermined speed, and the rear wheels steer in the same direction to the front wheels when the vehicle is above the predetermined speed.

* * * * *